United States Patent
Chuang et al.

(10) Patent No.: US 6,700,775 B1
(45) Date of Patent: Mar. 2, 2004

(54) PORTABLE ELECTRONIC APPARATUS HAVING A COVER DEVICE WITH A STAND UNIT FOR SUPPORTING A USER INTERFACE DEVICE

(75) Inventors: Wei-Pin Chuang, Taipei (TW); Chih-Chuan Cheng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 22 days.

(21) Appl. No.: 10/348,946

(22) Filed: Jan. 23, 2003

(30) Foreign Application Priority Data

Nov. 22, 2002 (TW) ...................................... 91218913 U

(51) Int. Cl.[7] .................................................. G06F 1/16
(52) U.S. Cl. ....................... 361/680; 361/681; 361/683; 361/686
(58) Field of Search ................................ 361/679, 680, 361/681, 683, 686

(56) References Cited

U.S. PATENT DOCUMENTS 5,440,502 A * 8/1995 Register ..................... 361/681
6,064,373 A * 5/2000 Ditzik ........................ 345/173
6,256,193 B1 * 7/2001 Janik et al. ................. 361/683
6,464,195 B1 * 10/2002 Hildebrandt ................ 248/460

* cited by examiner

*Primary Examiner*—Darren Schuberg
*Assistant Examiner*—Yean-Hsi Chang
(74) *Attorney, Agent, or Firm*—Bacon & Thomas, PLLC

(57) ABSTRACT

In a portable electronic apparatus, a cover device includes a stand unit provided on a cover body. The stand unit includes a support member connected to and pivotable relative to the cover body. A foldable limiting member is connected to the support member and is connected to the cover body for limiting the support member at the supporting position. The cover device is assembled removably on a user interface device for protecting an operating surface of the user interface device when the support member is in a collapsed position, where the support member lies on the cover body, and is removed from the user interface device to permit movement of the support member to a supporting position, where the support member forms an angle with the cover body for positioning the user interface device on the stand unit.

8 Claims, 6 Drawing Sheets

PORTABLE ELECTRONIC APPARATUS HAVING A COVER DEVICE WITH A STAND UNIT FOR SUPPORTING A USER INTERFACE DEVICE

CROSS-REFERENCE TO RELATED APPLICATION

This application claims priority of Taiwanese Application No. 091218913, filed on Nov. 22, 2002.

BACKGROUND OF THE INVENTION

1. Field of the Invention

The invention relates to a portable electronic apparatus, more particularly to a portable electronic apparatus having a cover device with a stand unit for supporting a user interface device.

2. Description of the Related Art

A conventional tablet personal computer generally includes a main housing provided with a touch-control display module thereon, and a plastic cover body for covering the touch-control display module.

During use, in order to maintain an appropriate sight angle of vision between the user's eyes and the touch-control display module, an additional support member is required to support the touch-control display module. Furthermore, an external keyboard unit has to be connected to the touch-control display module for facilitating input of a large amount of data.

SUMMARY OF THE INVENTION

Therefore, the object of the present invention is to provide a portable electronic apparatus that has a cover device with a stand unit for supporting a user interface device.

According to the present invention, a portable electronic apparatus comprises:
  a user interface device having a housing with an operating surface; and
  a cover device including
    a cover body having inner and outer surfaces, a front end, and a rear connecting end opposite to the front end in a first direction, and
    a stand unit provided on the inner surface of the cover body, the stand unit including
      a support member that has a pivot end connected to the inner surface of the cover body adjacent to the rear connecting end and pivotable about a first axis that extends in a second direction transverse to the first direction, and a movable end opposite to the pivot end, the support member being operable so as to move from a collapsed position, where the support member lies on the inner surface of the cover body, to a supporting position, where the movable end of the support member is spaced apart vertically from the inner surface of the cover body such that the support member forms an angle with the inner surface of the cover body, and
      a foldable limiting member that has a first end connected to the movable end of the support member, and a second end opposite to the first end and connected to the inner surface of the cover body between the front end and the rear connecting end for limiting the support member at the supporting position;
    the cover device being assembled removably on the housing for protecting the operating surface when the support member is in the collapsed position;
    the cover device being removed from the housing to permit movement of the support member to the supporting position for positioning the housing on the stand unit when the support member is in the supporting position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
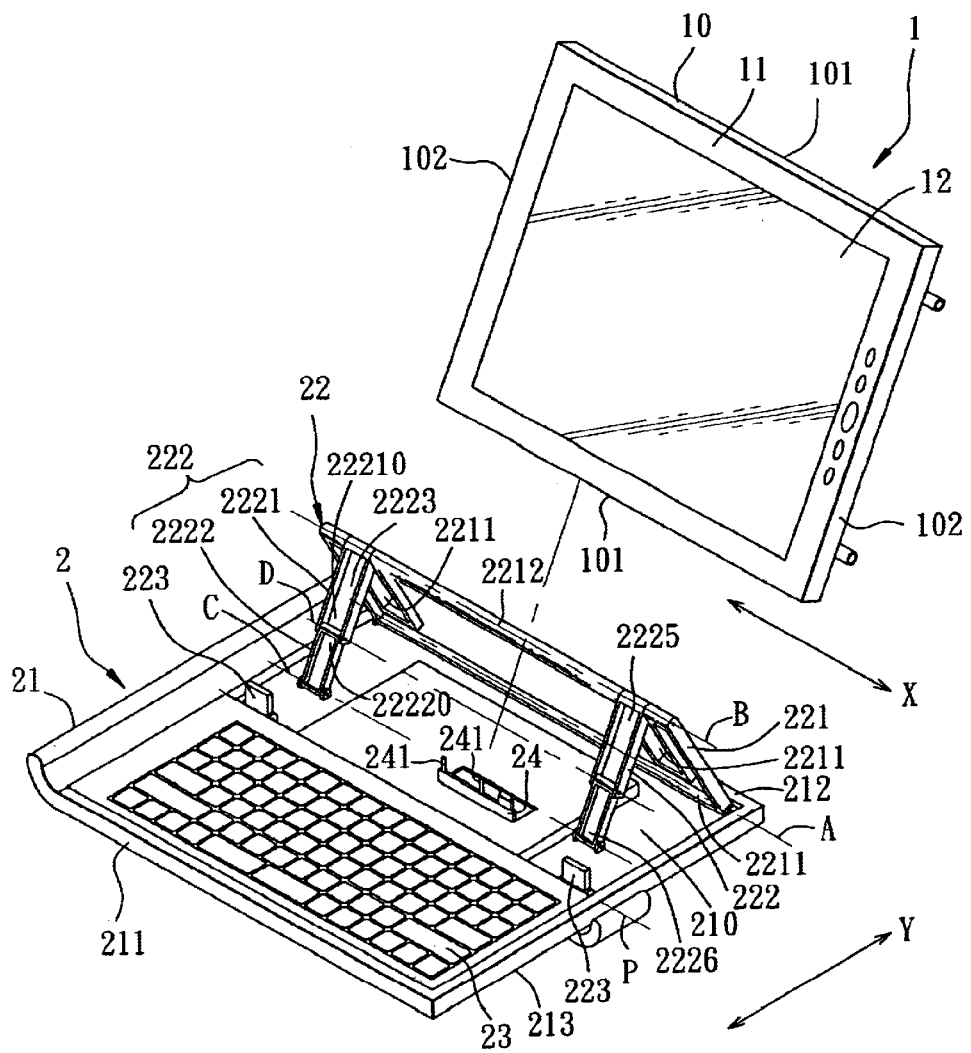
FIG. 1 is an exploded perspective view showing the preferred embodiment of a portable electronic apparatus according to the present invention.

Referring to FIG. 1, the preferred embodiment of a portable electronic apparatus, such as a tablet is personal computer, according to the present invention is shown to include a user interface device 1, and a cover device 2.

The user interface device 1 has a rectangular housing 10 with an operating surface 11. In this embodiment, the housing 10 has opposite longer sides 101 and opposite shorter sides 102. The user interface device 1 includes a touch-control display module 12 mounted on the housing 10 and accessible from the operating surface 11.

The cover device 2 includes a cover body 21, and a stand unit 22.

The cover body 21 has a size which substantially matches that of the operating surface 11 of the housing 10. The cover body 21 has inner and outer surfaces 210, 213, a front end 211, and a rear connecting end 212 opposite to the front end 211 in a first direction (Y)

Figure 2:
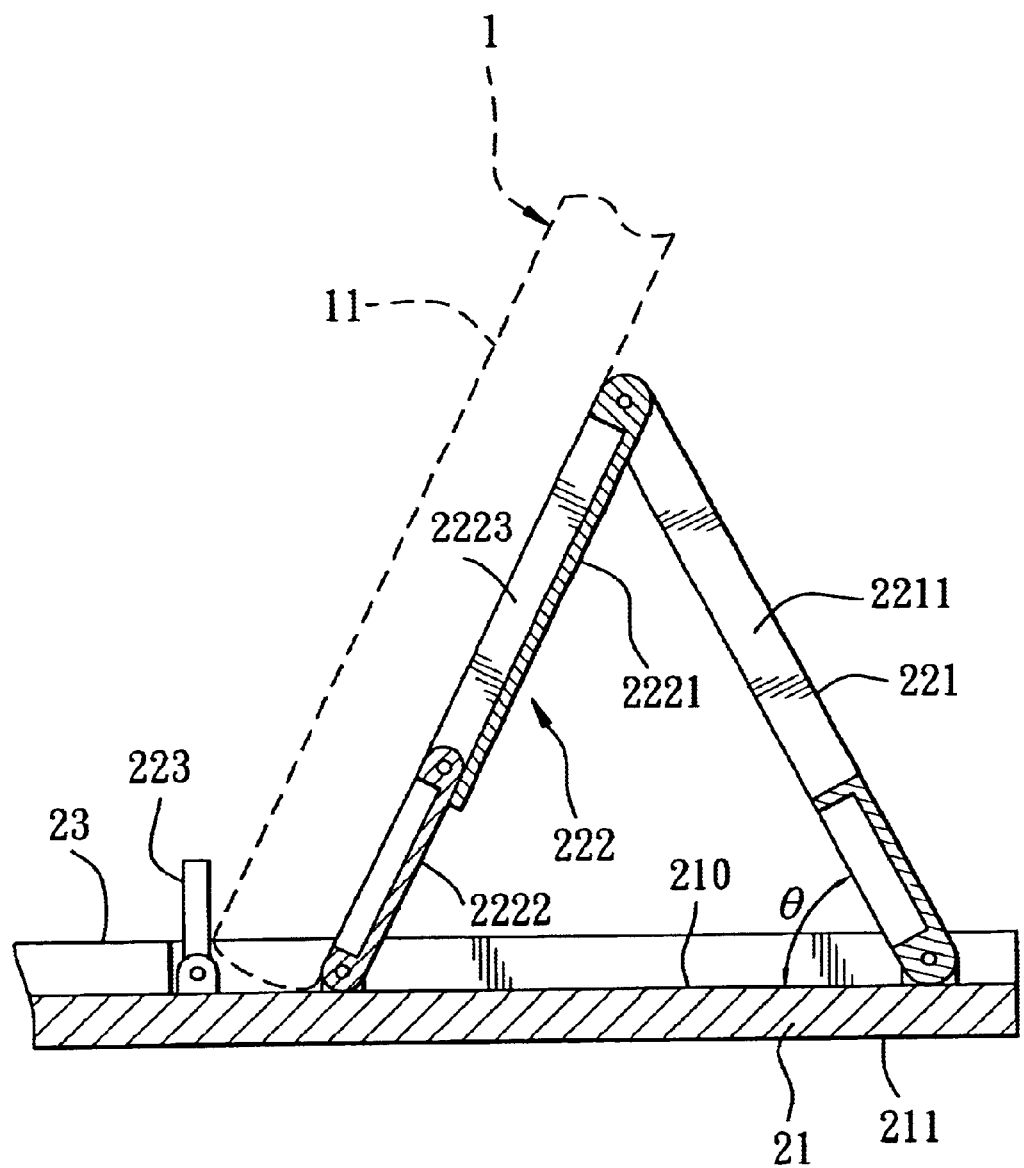
FIG. 2 is a fragmentary schematic sectional view showing a cover device of the preferred embodiment in FIG. 1.

The stand unit 22 is provided on the inner surface 210 of the cover body 21. The stand unit 22 includes a support member 221 and a pair of foldable limiting members 222. The support member 221 has a pivot end 2211 connected to the inner surface 210 of the cover body 21 adjacent to the rear connecting end 212 and pivotable about a first axis (A) that extends in a second direction (X) transverse to the first direction (Y), and a movable end 2212 opposite to the pivot end 2211. The support member 221 is operable so as to move from a collapsed position, where the support member 221 lies on the inner surface 210 of the cover body 21 (see FIG. 4), to a supporting position, where the movable end 2212 of the support member 221 is spaced apart vertically from the inner surface 210 of the cover body 21 such that the support member 221 forms an angle (θ) with the inner surface 210 of the cover body 21 (see FIG. 2). The limiting members 222 are disposed on the inner surface 210 of the cover body 21, and are spaced apart from each other in the second direction (X). Each of the limiting members 222 has a first end 2225 connected to the movable end 2212 of the support member 221, and a second end 2226 opposite to the first end 2225 and connected to the inner surface 210 of the cover body 21 between the front end 211 and the rear connecting end 212 for limiting the support member 221 at the supporting position. In this embodiment, each of the limiting members 222 includes an upper link 2221 formed with the first end 2225 and pivotable relative to the movable end 2212 about a second axis (B) parallel to the first axis (A) , and a lower link 2222 formed with the second end 2226 and pivotable relative to the cover body 21 about a third axis (C) parallel to the first axis (A). The upper link 2221 further has a lower link end 22210. The lower link 2222 further has an upper link end 22220 coupled to and pivotable relative to the lower link end 22210 about a fourth axis (D) parallel to the first axis (A).

Figure 5:
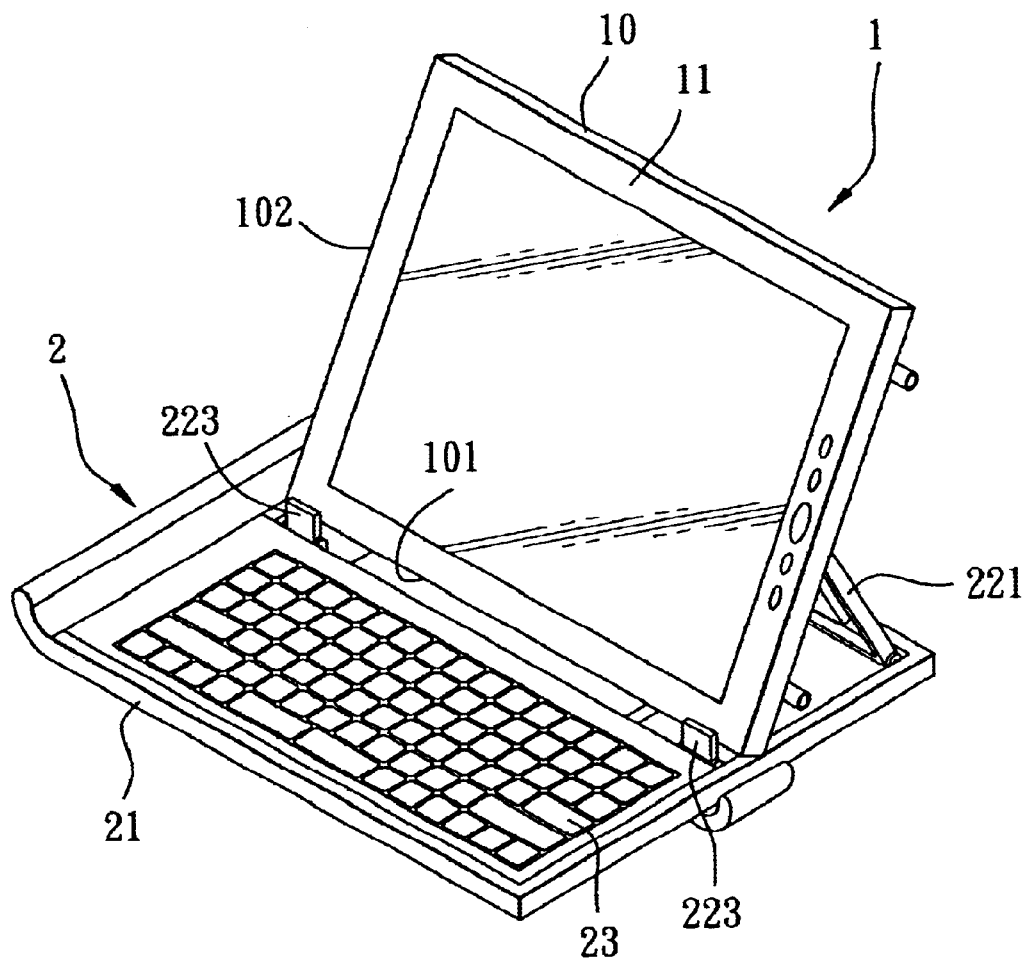
FIG. 5 is a perspective view showing the preferred embodiment in a state of use.
Figure 6:
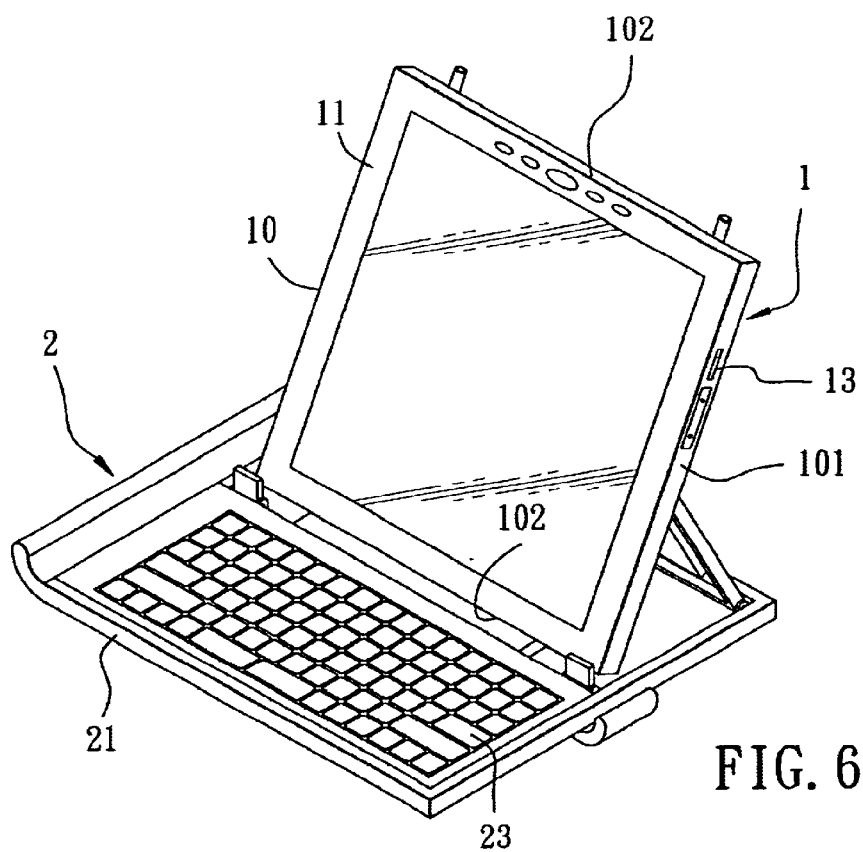
FIG. 6 is a perspective view showing the preferred embodiment in another state of use.

The stand unit 22 further includes a pair of stop members 223 disposed on the inner surface 210 of the cover body 21 and spaced apart from each other in the second direction (X). Each of the stop members 223 is disposed on the inner surface 210 of the cover body 21 between the second end 2226 of a corresponding one of the limiting members 222 and the front end 211 of the cover body 21 such that the housing 10 can be disposed on the inner surface 210 of the cover body 21 to rest against the limiting members 222 and can be stopped by the stop members 223 when the support member 221 is in the supporting position, as shown in FIG. 5. In use, the housing 10 can be disposed so that one of the longer sides 101 abuts against the inner surface 210 of the cover body 21, as shown in FIG.5, or one of the shorter sides 102 of the housing 10 abuts against the inner surface 210 of the cover body 21, as shown in FIG. 6. In this embodiment, the stop members 223 are pivotable relative to the cover body 21 about a pivot axis (P) parallel to the first axis (A) so as to be foldable toward and away: from the inner surface 210 of the cover body 21.

Figure 3:
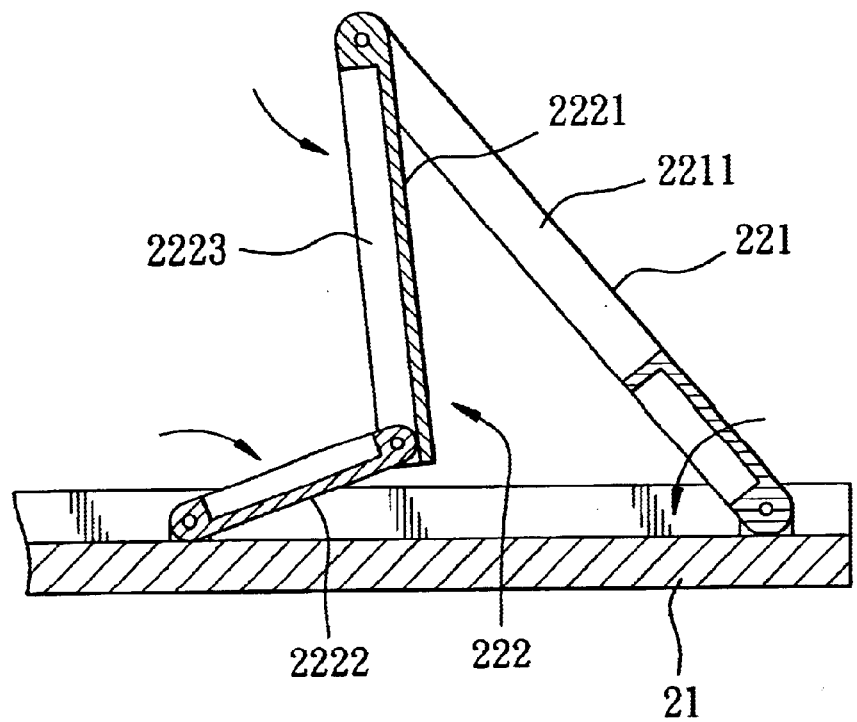
FIG. 3 is a fragmentary schematic sectional view of the cover device to illustrate how a support member is moved from a supporting position to a collapsed position.
Figure 4:
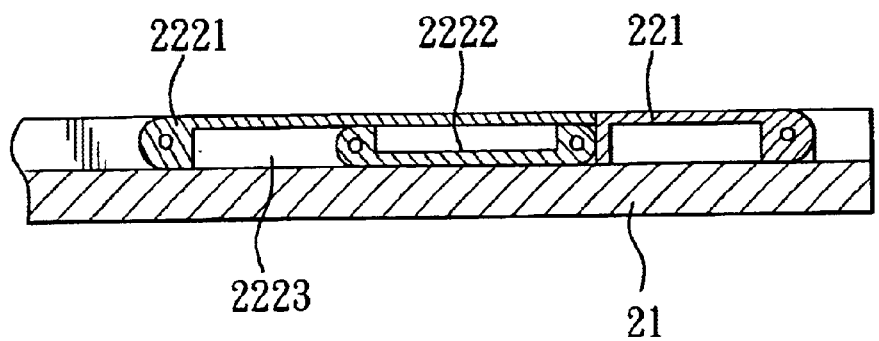
FIG. 4 is a fragmentary schematic sectional view showing the cover device when the supporting member is disposed in the collapsed position.

With further reference to FIGS. 1, 3 and 4, in order to enable the upper link 2221 to flush with the support member 221 when the support member 221 is in the collapsed position, the support member 221 is formed with a pair of openings 2211, each of which has a size not smaller than that of the upper links 2221. Each of the upper links 2221 is formed with a receiving groove 2223 having a size not smaller than that of the lower link 2222. Each of the upper links 2221 is received in a corresponding one of the openings 2211, and each of the lower links 2222 is received in the receiving groove 2223 in a corresponding one of the upper links 2221 when the support member 221 is in the collapsed position.

Figure 8:
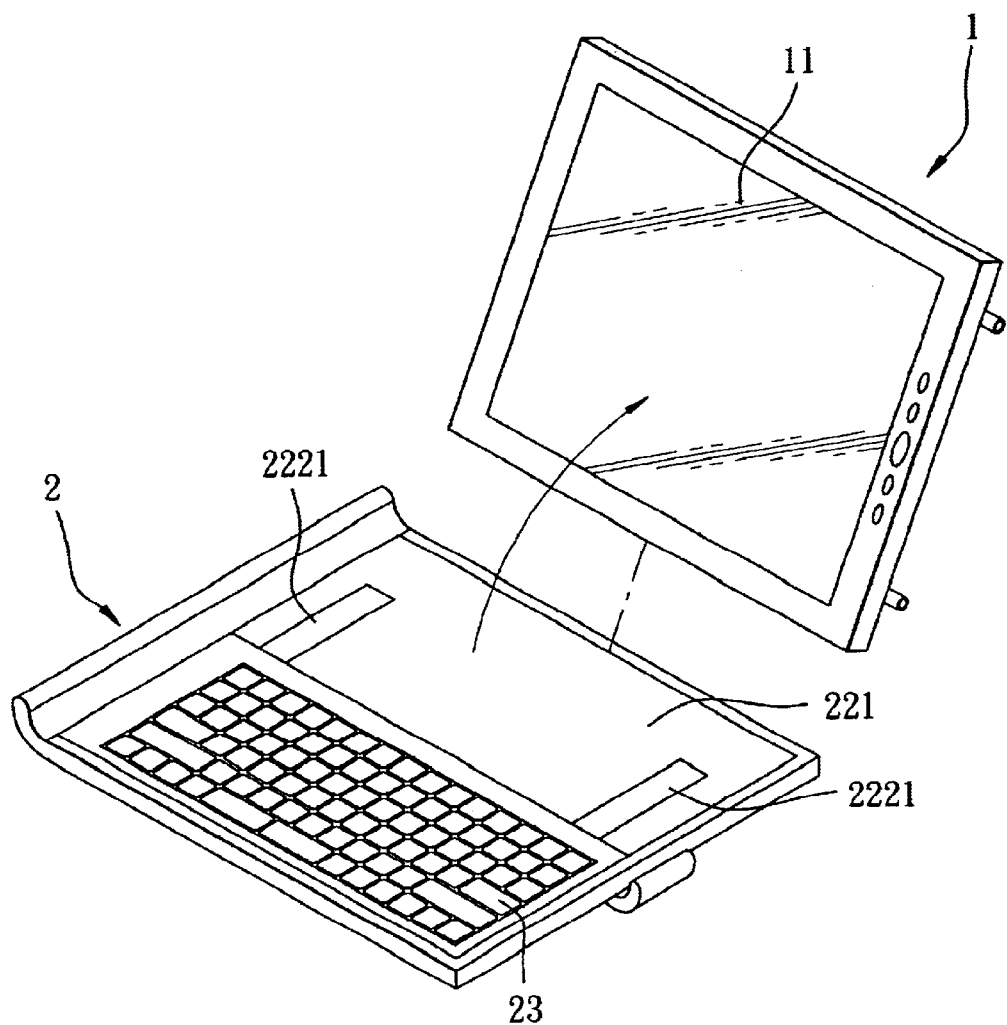
FIG. 8 is a perspective view of the preferred embodiment to illustrate how the cover device is assembled to a user interface device when the support member is disposed in the collapsed position.

Therefore, the cover device 2 is assembled removably on the housing 10 for protecting the operating surface 11 when the support member 221 is in the collapsed position, as shown in FIG. 8. The cover device 2 is removed from the housing 10 to permit movement of the support member 221 to the supporting position for positioning the housing 10 on the stand unit 22 when the support member 221 is in the supporting position.

Figure 7:
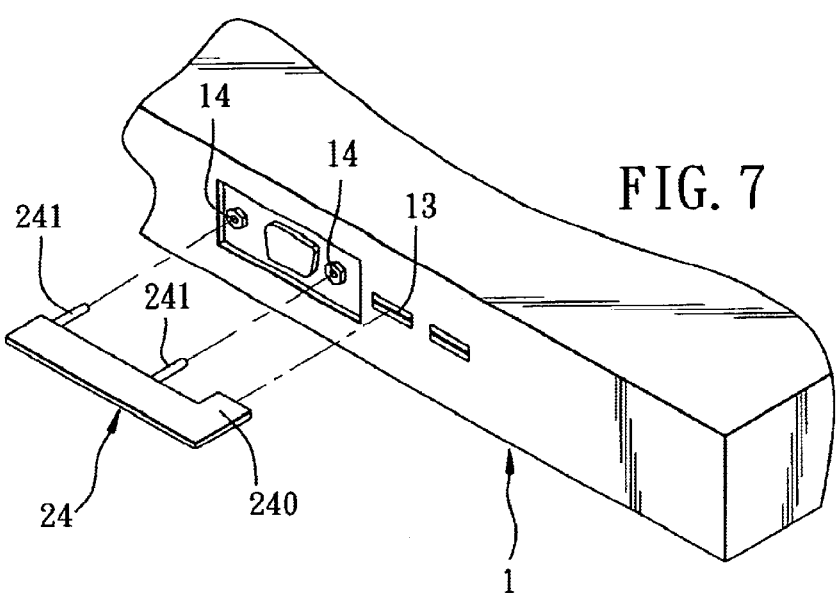
FIG. 7 is a fragmentary perspective view of the preferred embodiment to illustrate how a first connector is connected to a second connector.

With further reference to FIGS. 1 and 7, the cover device 2 further includes a keyboard unit 23 mounted on the inner surface 210 of the cover body 2 between the second ends 2226 of the limiting members 222 and the front end 211 of the cover body 21. The cover body 21 is further provided with a connector member 24 that is disposed pivotally on the inner surface 210. The connector member 24 has a first connector 240 that is connected electrically to the keyboard unit 23. The housing 10 of the user interface device 1 is provided with a second connector 13 that is disposed on one of the longer and shorter sides 101, 102 and that is connected electrically and removably to the first connector 240 when the housing 10 is positioned on the stand unit 22. In this embodiment, the housing 10 has two second connectors 13 that are respectively disposed on one of the longer sides 101 and one of the shorter sides 102 of the housing 10. When the housing 10 is positioned on the stand unit 22, the longer or shorter side 101, 102 which is provided with one of the second connectors 13 abuts against the inner surface 210 of the cover body 21. In this embodiment, the first and second connectors 240, 13 utilize a universal serial bus (USB) interface (not shown) for data transmission. By means of a hot plug in the USB interface, it is possible to enable the user interface device 1 to connect electrically with or disconnect from the keyboard unit 23 when the user interface device 1 is powered on. The connector member 24 further has a pair of positioning posts 241 that extend respectively into a pair of positioning holes 14 formed in the housing 10 and disposed adjacent to a respective one of the second connector 13 for facilitating alignment of the first and second connectors 240, 13.

In view of the foregoing, due to the provision of the stand unit 22 and the keyboard unit 23 of the cover device 2, use of the portable electronic apparatus of the present invention is facilitated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A portable electronic apparatus comprising:
   a user interface device having a housing with an operating surface; and
   a cover device including
      a cover body having inner and outer surfaces, a front end, and a rear connecting end opposite to said front end in a first direction, and
      a stand unit provided on said inner surface of said cover body, said stand unit including
         a support member that has a pivot end connected to said inner surface of said cover body adjacent to said rear connecting end and pivotable about a first axis that extends in a second direction transverse to the first direction, and a movable end opposite to said pivot end, said support member being operable so as to move from a collapsed position, where said support member lies on said inner surface of said cover body, to a supporting position, where said movable end of said support member is spaced apart vertically from said inner surface of said cover body such that said support member forms an angle with said inner surface of said cover body, and
         a foldable limiting member that has a first end connected to said movable end of said support member, and a second end opposite to said first end and connected to said inner surface of said cover body between said front end and said rear connecting end for limiting said support member at the supporting position;

said cover device being assembled removably on said housing for protecting said operating surface when said support member is in the collapsed position;

said cover device being removed from said housing to permit movement of said support member to the supporting position for positioning said housing on said stand unit when said support member is in the supporting position.

2. The portable electronic apparatus as claimed in claim 1, wherein said stand unit further includes a stop member disposed on said inner surface of said cover body between said second end of said limiting member and said front end of said cover body such that said housing can lie against said limiting member and can be stopped by said stop member when said support member is in the supporting position.

3. The portable electronic apparatus as claimed in claim 2, wherein said stop member is pivotable relative to said cover body about a pivot axis parallel to the first axis so as to be foldable toward and away from said inner surface of said cover body.

4. The portable electronic apparatus as claimed in claim 1, wherein said limiting member includes an upper link formed with said first end and pivotable relative to said movable end about a second axis parallel to the first axis, and a lower link formed with said second end and pivotable relative to said cover body about a third axis parallel to the first axis, said upper link further having a lower link end, said lower link further having an upper link end coupled to and pivotable relative to said lower link end about a fourth axis parallel to the first axis.

5. The portable electronic apparatus as claimed in claim 4, wherein said support member is formed with an opening having a size not smaller than that of said upper link, said upper link being formed with a receiving groove having a size not smaller than that of said lower link, said upper link being received in said opening and said lower link being received in said receiving groove when said support member is in the collapsed position.

6. The portable electronic apparatus as claimed in claim 1, wherein said cover device further includes a keyboard unit mounted on said inner surface of said cover body between said second end of said limiting member and said front end of said cover body.

7. The portable electronic apparatus as claimed in claim 6, wherein said cover body is further provided with a first connector that is disposed pivotally on said inner surface and that is connected electrically to said keyboard unit, said housing of said user interface device being provided with a second connector that is connected electrically and removably to said first connector when said housing is positioned on said stand unit.

8. The portable electronic apparatus as claimed in claim 1, wherein said user interface device includes a touch-control display module mounted on said housing and accessible from said operating surface.

* * * * *